(12) United States Patent
Jacob et al.

(10) Patent No.: US 8,500,085 B2
(45) Date of Patent: Aug. 6, 2013

(54) METHOD FOR MANUFACTURING A COMPOSITE FIBER COMPONENT FOR AEROSPACE

(75) Inventors: Torben Jacob, Beckdorf (DE); Joachim Piepenbrock, Buxtehude (DE)

(73) Assignee: Airbus Operations GmbH, Hamburg (DE)

( * ) Notice: Subject to any disclaimer, the term of this patent is extended or adjusted under 35 U.S.C. 154(b) by 565 days.

(21) Appl. No.: 12/227,659

(22) PCT Filed: Jul. 5, 2007

(86) PCT No.: PCT/EP2007/056855
§ 371 (c)(1),
(2), (4) Date: Mar. 6, 2009

(87) PCT Pub. No.: WO2008/003767
PCT Pub. Date: Jan. 10, 2008

(65) Prior Publication Data
US 2009/0166921 A1 Jul. 2, 2009

Related U.S. Application Data

(60) Provisional application No. 60/818,771, filed on Jul. 6, 2006.

(30) Foreign Application Priority Data

Jul. 6, 2006 (DE) .................. 10 2006 031 335

(51) Int. Cl.
*B28B 7/30* (2006.01)
*B28B 7/28* (2006.01)
*A01J 21/00* (2006.01)
*B29C 45/14* (2006.01)

(52) U.S. Cl.
USPC ........... 249/185; 249/178; 249/180; 249/181; 249/182; 425/175; 425/383; 425/385; 425/387.1; 425/388; 425/389; 425/392; 425/393; 425/403; 425/468; 425/500; 425/501; 425/502; 425/503; 425/504; 264/257; 264/258; 264/299; 264/319

(58) Field of Classification Search
USPC ............. 425/393, 403, 175, 383, 385, 387.1, 425/388, 389, 392, 468, 500, 501, 502, 503, 425/504; 249/178, 180, 181, 182, 185; 264/257, 264/258, 299, 319
See application file for complete search history.

(56) References Cited

U.S. PATENT DOCUMENTS 2,244,107 A * 6/1941 Hayes ..................... 249/180
3,143,306 A * 8/1964 Dijkmans et al. .......... 242/437.3
(Continued)

FOREIGN PATENT DOCUMENTS

CH  EP1197309    4/2002
DE  1604528      11/1970
(Continued)

OTHER PUBLICATIONS

Airtech, Masterflex "S" Series (Mar. 24, 1997).
(Continued)

*Primary Examiner* — Christina Johnson
*Assistant Examiner* — Atul P Khare
(74) *Attorney, Agent, or Firm* — Jenkins, Wilson, Taylor & Hunt, P.A.

(57) ABSTRACT

Method for manufacturing a composite fiber component (1) the method comprising the following method steps: forming a moulding core (4) comprising a hollow profile (15) made of segments (16a . . . d) in order to establish an external geometry of the moulding core (4), wherein the segments (16a . . . d) of the moulding core (4) each extend in the direction of the longitudinal axis of the moulding core (4) and are each constructed so as to be pivotable about an axis running in the longitudinal direction of the moulding core (4), between a folded position (A), and an unfolded position (B) of the hollow profile (15) of the moulding core (4), wherein the segments (16a . . . d) are constructed so as to be coupled to one another via connections (18a . . . d, 19a . . . c) in one piece in order to form the hollow profile (15); at least one fiber semi-finished product (3) is positioned at least in certain sections on the constructed moulding core (4) in order to shape at least one moulded section (14) of the composite fiber component (1) to be manufactured; and heat and/or pressure is applied to the at least one moulded section (14) in order to manufacture the composite fiber component (1).

10 Claims, 6 Drawing Sheets

U.S. PATENT DOCUMENTS

| | | | | |
|---|---|---|---|---|
| 3,279,739 | A | * | 10/1966 | Long .......................... 249/181 |
| 3,279,741 | A | * | 10/1966 | Long .......................... 249/181 |
| 3,551,237 | A | | 12/1970 | Cox et al. |
| 3,629,030 | A | | 12/1971 | Ash |
| 3,754,717 | A | * | 8/1973 | Saidla ...................... 242/437.3 |
| 3,995,081 | A | | 11/1976 | Fant et al. |
| 4,094,688 | A | | 6/1978 | Wolf |
| 4,155,970 | A | | 5/1979 | Cassell |
| 4,248,817 | A | | 2/1981 | Frank |
| 4,271,116 | A | | 6/1981 | Jones |
| 4,503,105 | A | | 3/1985 | Tomioka |
| 4,520,988 | A | * | 6/1985 | Walker ........................ 249/13 |
| 4,758,397 | A | * | 7/1988 | Schreiner et al. ............ 264/166 |
| 4,871,599 | A | | 10/1989 | Knorr |
| 4,943,334 | A | | 7/1990 | Medney |
| 5,041,315 | A | | 8/1991 | Searle et al. |
| 5,045,251 | A | | 9/1991 | Johnson |
| 5,176,864 | A | | 1/1993 | Bates et al. |
| 5,262,121 | A | | 11/1993 | Goodno |
| 5,376,326 | A | | 12/1994 | Medney |
| 5,387,098 | A | | 2/1995 | Willden |
| 5,505,492 | A | | 4/1996 | Nelson |
| 5,527,414 | A | | 6/1996 | Dublinski et al. |
| 5,931,830 | A | | 8/1999 | Jacobsen et al. |
| 5,989,481 | A | | 11/1999 | You |
| 6,013,125 | A | | 1/2000 | Quraishi et al. |
| 6,458,306 | B1 | | 10/2002 | Nelson et al. |
| 6,458,309 | B1 | | 10/2002 | Allen |
| 6,562,436 | B2 | | 5/2003 | George et al. |
| 6,632,502 | B1 | | 10/2003 | Allen et al. |
| 6,638,466 | B1 | | 10/2003 | Abbott |
| 6,692,681 | B1 | | 2/2004 | Lunde |
| 7,192,543 | B2 | | 3/2007 | Malfliet |
| 7,294,220 | B2 | | 11/2007 | Anderson |
| 7,531,058 | B2 | | 5/2009 | Grose et al. |
| 2002/0022422 | A1 | | 2/2002 | Waldrop et al. |
| 2002/0038923 | A1 | | 4/2002 | Lenherr |
| 2002/0056788 | A1 | | 5/2002 | Anderson et al. |
| 2003/0183983 | A1 | | 10/2003 | Schmidt |
| 2004/0103918 | A1 | | 6/2004 | Teufel et al. |
| 2004/0216805 | A1 | | 11/2004 | Teufel |
| 2005/0002269 | A1 | | 1/2005 | Longo |
| 2005/0230552 | A1 | * | 10/2005 | Engwall et al. ............... 244/133 |
| 2007/0108665 | A1 | | 5/2007 | Glain et al. |
| 2009/0166935 | A1 | | 7/2009 | Jacob et al. |
| 2010/0007044 | A1 | | 1/2010 | Jacob et al. |
| 2010/0044912 | A1 | | 2/2010 | Zahlen et al. |
| 2010/0092708 | A1 | | 4/2010 | Jacob et al. |
| 2011/0076461 | A1 | | 3/2011 | Jacob et al. |

FOREIGN PATENT DOCUMENTS

| | | | |
|---|---|---|---|
| DE | | 1671756 | 10/1971 |
| DE | EP0002711 | | 7/1979 |
| DE | | 8711336 | 10/1987 |
| DE | | 277234 | 3/1990 |
| DE | | 3911312 | 4/1990 |
| DE | | 4224526 | 1/1994 |
| DE | | 10342867 | 4/2005 |
| EP | | 0212140 | 3/1987 |
| EP | | 0291203 | 11/1988 |
| EP | | 0491650 | 6/1992 |
| FR | | 2745745 | 9/1997 |
| GB | | 1522432 | 8/1978 |
| GB | | 2292332 | 4/1994 |
| GB | | 2284173 | 5/1995 |
| IT | EP0735639 | | 10/1996 |
| JP | | 58-018240 | 2/1983 |
| JP | | 61-188425 | 8/1986 |
| JP | 59-157807 (U) | * | 10/1986 |
| JP | | 63-310310 | 12/1988 |
| JP | | 2248239 | 10/1990 |
| JP | | 04-265714 | 9/1992 |
| JP | | 06-106632 | 4/1994 |
| JP | | 08-142060 | 6/1996 |
| JP | | 08-203751 | 8/1996 |
| JP | | 08207134 | 8/1996 |
| JP | | 11090979 | 4/1999 |
| JP | | 2003-071864 | 3/2003 |
| JP | | 2003-103643 | 4/2003 |
| JP | | 03-277532 | 10/2003 |
| JP | | DE69811606 | 2/2004 |
| JP | | 2006-512240 | 4/2006 |
| JP | | 2009-517271 | 4/2009 |
| RU | | 1123235 A2 | 2/1993 |
| RU | | 2080750 | 5/1997 |
| RU | | 2143341 C1 | 12/1999 |
| RU | | 2217312 | 11/2003 |
| RU | | 2242369 C1 | 12/2004 |
| RU | | 2271276 C2 | 3/2006 |
| RU | | 2285613 C1 | 10/2006 |
| SE | | EP1762355 | 3/2007 |
| SU | | 204550 | 10/1967 |
| SU | | 433038 | 6/1974 |
| WO | | WO 87/01650 | 3/1987 |
| WO | | WO 88/01938 | 3/1988 |
| WO | | WO9514563 | 6/1995 |
| WO | | WO9851481 | 11/1998 |
| WO | | WO00/01520 | 1/2000 |
| WO | | WO2004000643 | 12/2003 |
| WO | | WO2005105402 | 11/2005 |
| WO | | WO2007062693 | 6/2007 |
| WO | | WO2007107553 | 9/2007 |
| WO | | WO2008003715 | 1/2008 |
| WO | | WO2008003721 | 1/2008 |
| WO | | WO2008003733 | 1/2008 |
| WO | | WO2008003740 | 1/2008 |
| WO | | WO2008003767 | 1/2008 |
| WO | | WO2008003768 | 1/2008 |

OTHER PUBLICATIONS

Final Office Action for U.S. Appl. No. 12/227,679 dated Mar. 23, 2010.
Non-Final Office Action for U.S. Appl. No. 12/309,083 dated Nov. 15, 2010.
Final Office Action for U.S. Appl. No. 12/227,679 dated Jan. 19, 2011.
Final Office Action for U.S. Appl. No. 12/309,083 dated Apr. 4, 2011.
V.P. Pustovoitov "Fibreglasses in building construction", Moscow, Stroyzdat, pp. 64-65 (1978).
"Hand Book of Adhesives" pp. 80-81 (1980).
Decision on Grant for Russian Patent Application No. 2009102870/05(003680) dated Jun. 8, 2011.
Advisory Action for U.S. Appl. No. 12/309,083 dated Jun. 9, 2011.
Decision on Grant for Russian Patent Application No. 2009102868/05(003677) dated Jun. 16, 2011.
Decision to Grant for Russian Appication No. 2009/102869/05(003679) dated Jun. 24, 2011.
Decision to Grant for Russian Application No. 2009/103204/05(004166) dated Jun. 24, 2011.
Advisory Action for U.S. Appl. No. 12/227,679 dated Jul. 2, 2010.
Non-Final Office Action for U.S. Appl. No. 12/227,679 dated Aug. 2, 2010.
Non-Final Office Action for U.S. Appl. No. 12/227,679 dated Sep. 16, 2009.
International Search Report and Written Opinion for PCT/EP/2007/056799 dated Sep. 26, 2007.
German Office Action for DE 10 2006 031 323.2 dated Mar. 16, 2007.
International Search Report and Written Opinion for PCT/EP/2007/056856 dated Oct. 29, 2007.
International Search Report and Written Opinion for PCT/EP/2007/056788 dated Oct. 29, 2007.
German Office Action for DE 10 2006 031 334.8 dated Mar. 15, 2007.
International Search Report and Written Opinion for PCT/EP/2007/056767 dated Nov. 8, 2007.
German Office Action for DE 10 2006 031 326.7 dated Mar. 14, 2007.
International Search Report and Written Opinion for PCT/EP/2007/056855 dated Sep. 25, 2007.
German Office Action for DE 10 2006 031 335.6 dated Mar. 15, 2007.
International Search Report and Written Opinion for PCT/EP/2007/056743 dated Nov. 14, 2007.
German Office Action for DE 10 2006 031 336.4 dated Mar. 21, 2007.

Final Office Action for U.S. Appl. No. 12/227,679 dated Mar. 6, 2009.
Decision to Grant (English) for Russion Application No. 2009/103205/05(004168) dated Oct. 19, 2011.
Grant Decision (English) for Russian Application No. 2009103203/05(004165) dated Sep. 5, 2011.
Office Action/Restriction Requirement for U.S. Appl. No. 12/308,793 dated Mar. 19, 2012.
Chinese Grant Notification for CN Appl. No. 2007 8002 5659.0 dated Feb. 1, 2012.
Office Action/Restriction Requirement for U.S. Appl. No. 12/309,015 dated Apr. 13, 2012.
Non-Final Office Action for U.S. Appl. No. 12/309,083 dated Aug. 16, 2011.
Non-Final Office Action for U.S. Appl. No. 12/227,679 dated Dec. 6, 2011.
Final Office Action for U.S. Appl. No. 12/309,083 dated Dec. 7, 2011.
Non-Final Office Action for U.S. Appl. No. 12/309,083 dated Apr. 23, 2012.
Non-Final Office Action for U.S. Appl. No. 12/308,793 dated Jun. 12, 2012.
Final Office Action for U.S. Appl. No. 12/227,679 dated Jul. 2, 2012.
Non-Final Office Action for U.S. Appl. No. 12/227,679 dated Nov. 21, 2012.
Chinese Grant for Application Appl. No. 200780021406.6 dated Oct. 10, 2012.
Japanese Office Action for Application Serial No. JP 2009-517271 (with Engl. Transl.) dated Jul. 11, 2012.
Final Office Action for U.S. Appl. No. 12/308,793 dated Nov. 6, 2012.
Japanese Office Action for Application Serial No. JP 2009-517267 dated Jul. 11, 2012.
Japanese Office Action for Application Serial No. JP 2009-517264 dated Jul. 11, 2012.
Japanese Office Action for Application Serial No. JP 2009-517271 dated Jul. 11, 2012.
Final Office Action for U.S. Appl. No. 12/309,083 dated Sep. 6, 2012.
Non-Final Office Action for U.S. Appl. No. 12/309,015 dated Dec. 5, 2012.
Japanese Office Action for Application No. 2009-517281 dated Oct. 5, 2012.
Non-Final Office Action for U.S. Appl. No. 12/309,083 dated Mar. 19, 2013.

* cited by examiner

METHOD FOR MANUFACTURING A COMPOSITE FIBER COMPONENT FOR AEROSPACE

CROSS-REFERENCE TO RELATED APPLICATIONS

The present application is a National Stage Entry of International Application No. PCT/EP2007/056855, filed Jul. 5, 2007, which is based on German Patent Application No. DE 102006031335.6 and U.S. Provisional Application No. 60/818,771, each filed on Jul. 6, 2006.

FIELD OF THE INVENTION

The present invention relates to a method for manufacturing a composite fiber component, in particular for aerospace, to a molding core for manufacturing such a composite fiber component and to a composite fiber component having at least one stringer which is manufactured by means of such a molding core and/or such a method.

BACKGROUND OF THE INVENTION

Although the present invention can be applied to any composite fiber components, said present invention and the problem on which it is based are explained in more detail below with reference to planar, stringer-reinforced carbon fiber plastic (CFK) components, for example skin panels of an aircraft.

It is generally known to reinforce carbon fiber plastic skin panels with carbon fiber plastic stringers in order to withstand the high loads in the field of aircraft together with the lowest possible additional weight. In this context, essentially two types of stringers are distinguished: T and Ω stringers.

The cross section of T stringers is composed of a base and a web. The base forms the connecting surface to the skin panel. The use of skin panels which are reinforced with T stringers is widespread in aircraft construction.

Ω stringers have an approximately hat-shaped profile, with the ends of said profile being connected to the skin panel. In the cured state of Ω stringers they can either be adhesively bonded onto the panel which is also cured or they can be cured at the same time as the panel wet on wet. The latter is desirable because it is more favourable in terms of processing technology. However, in order to carry out wet on wet manufacture of skin panels which are reinforced with Ω stringers, supporting cores or molding cores are necessary in order to secure the dimensionally unstable fiber semi-finished products in the desired Ω shape and support them during the manufacturing process. Skin panels with Ω stringers have, compared to T stringers, the advantage of a better infiltration capability during an infusion method in order to introduce a matrix, for example an epoxy resin, into the fiber semi-finished products. Compared to other known methods for manufacturing composite fiber components such as, for example, the prepreg method, infusion methods can be cost-effective because they permit the use of more cost-effective fiber semi-finished products.

When manufacturing Ω stringers, there is the problem, however, that the material which is used at present for the supporting core or molding core is costly and can be difficult to remove after the Ω stringers have been constructed so that the material which remains in the stringers disadvantageously increases the overall weight of the aircraft.

SUMMARY OF THE INVENTION

It is one of the objects of the present invention to make available a more cost-effective and lightweight composite fiber component, in particular for aerospace.

Accordingly, a method for manufacturing a composite fiber component, in particular for aerospace, includes the following method steps:
  forming a molding core comprising a hollow profile made of segments in order to establish an external geometry of the molding core, wherein the segments of the molding core each extend in the direction of the longitudinal axis of the molding core and are each constructed so as to be pivotable about an axis running in the longitudinal direction of the molding core, between a folded position and an unfolded position of the hollow profile of the molding core, wherein the segments are constructed so as to be coupled to one another via connections in one piece in order to form the hollow profile;
  positioning at least one fiber semi-finished product at least in certain sections on the constructed molding core in order to shape at least one molded section of the composite fiber component to be manufactured; and
  applying heat and/or pressure to the at least one molded section in order to manufacture the composite fiber component.

Furthermore, a molding core for manufacturing a composite fiber component, in particular a stringer on a base component in aerospace, includes a hollow profile which is made in one piece from segments in order to establish an external geometry of the molding core, wherein the segments of the molding core each extend in the direction of the longitudinal axis of the molding core and can each be pivoted about at least one axis running in the longitudinal direction of the molding core, between a folded position and an unfolded position of the hollow profile of the molding core.

Furthermore, a composite fiber component having at least one stringer, in particular for aerospace, is provided, which is manufactured by means of the molding core according to the invention and/or the method according to the invention. The present invention thus has the advantage over the approaches mentioned at the beginning that the composite fiber component can be manufactured by means of a cost-effective molding core. Instead of costly conventional materials, a molding core is advantageously used which is composed of a hollow profile with segments which can be pivoted with respect to one another, and which core can be easily removed from the mold by pivoting the segments which results in a reduction in the cross section. A further advantage is the re-usability of such a molding core.

In one embodiment the segments of the molding core are coupled to one another by connections in order to be pivoted with one another between the folded position and the unfolded position of the hollow profile and in order to form a closed hollow profile. These connections permit the segments to be pivoted about the longitudinal axis of the molding core, with the connections being constructed in one piece together with the segments. In this context, the segments and the connections form a closed hollow profile. The latter can easily be manufactured in a cost-effective way from plastic in an extrusion process.

In an alternative embodiment, the segments of the molding core are constructed together with their pivotable connections as an open profile, for example made of a plastic, which profile is welded in order to form a closed hollow profile. This results in a particular advantage, in that open profiles can generally be manufactured more easily and with tighter tolerances because the inner surfaces can be produced better by means of supporting tools and molds.

The manufacture of the open profile also provides an advantage in that the connections are embodied in a prestressed fashion such that the hollow profile which is formed from them is provided with a particular position, either the folded position or the unfolded position.

In some embodiments, the segments and any subsegments thereof can comprise a plastic, for example a polysulfone. The connections can comprise the same material or have a second material which is particularly suitable for the necessary properties of the connections. For example, in one further alternative embodiment, the connections are constructed from a different material from the segments, said material being better suited to the requirements made of a flexible connection and desired prestresses. This other material can be introduced, for example, by means of coextrusion.

In a further embodiment, at least one segment has at least two subsegments which are pivotably connected in their longitudinal direction by means of a second connection. As a result, the hollow profile can be folded in such a way that only the corner regions have a type of linear contact, in the form of sliding rails, with the interior of the molded section when said hollow profile is removed from the mold, a lower frictional resistance being obtained as it is pulled out.

It may be particularly advantageous here if a subsegment is extended in its width beyond the second connection as a projection for forming a stop. As a result the unfolded position can be assumed precisely without overshooting of its end position.

The assumption of the respective position can be implemented by applying an internal pressure to the molding core according to the invention. The internal pressure may be regulated by a set point value in such a way that reproducible positions can be assumed by the hollow profile.

In a further embodiment, in the folded state the molding core according to the invention is covered by a core sleeve, for example a hose. This hose has such a circumference that it can easily be fitted over in the "folded molding core" state and subsequently extends smoothly around the folding core in the "unfolded molding core" state. Alternatively, a shrink-fit hose which can be fitted by the application of heat can be used. The hose forms a separating and/or sealing layer between the composite fiber component and the molding core. As a result, no undesired exchange of substances during the curing process is brought about and the removal of the molding core from the mold is made easier. The core sleeve can be, for example in some embodiments, formed from a plastic which is suitable for the process temperature and process pressure during manufacturing, such as during the curing process of fiber semi-finished products. In some embodiments, the core sleeve can be, for example, formed from a polyamide and/or a Polytetrafluoroethylene (PTFE) plastic.

According to one embodiment of the invention, reinforcement means in the region of junctions of the external geometry which are to be constructed with sharp edges in the molding core which is to be constructed are arranged inside and/or outside the core sleeve. These corner profile parts can also be components of the segment ends or connections. Additionally, the reinforcement means can be constructed as corner profile parts that can be made of at least one of metal or plastic.

The separating layer may be applied to the core sleeve and reduce adherence of the cured composite fiber component. This facilitates removal of the core sleeve after the at least partial curing of the section of the composite fiber component which has been produced by means of the molding core.

Fiber semi-finished products are to be understood as fabrics, overlays and fiber mats. The latter is provided with a matrix, for example an epoxy resin, and subsequently cured, for example using an autoclave.

According to a further embodiment of the invention, the molding core is arranged on a base part made of composite fiber semi-finished products and/or at least partly surrounded by fiber semi-finished products in order to construct at least one section of the composite fiber component. As a result, base parts, for example skin panels, pressure domes etc. can be constructed with Ω stringers. As an alternative or in addition to this it is also possible to manufacture separate composite fiber components which are entirely defined in terms of their shape by the molding core.

When an Ω stringer is manufactured for example, the core sleeve is pulled out of it in the longitudinal direction of the stringer. Consequently, said sleeve, like the core, no longer contributes to the overall weight of the aircraft and the payload of the aircraft can thus be increased.

BRIEF DESCRIPTION OF THE DRAWINGS

The present invention is explained in more detail below using preferred exemplary embodiments and with reference to the attached figures of the drawings, in which.

In the figures, the same reference numbers refer to identical or functionally identical components unless otherwise stated.

DETAILED DESCRIPTION OF THE INVENTION

Figure 1:
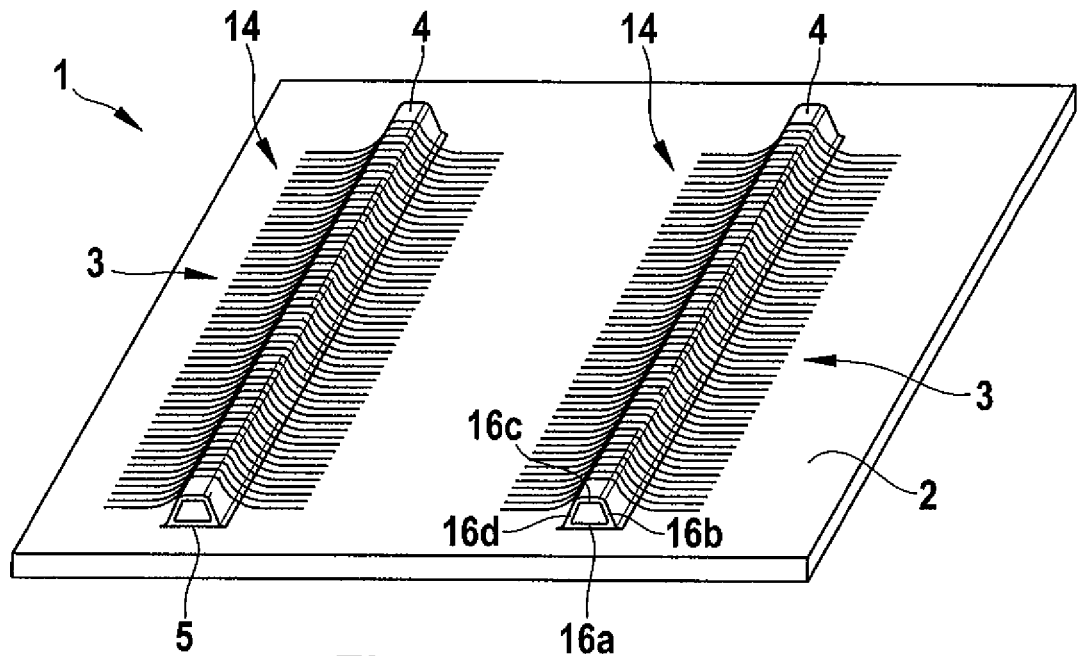
FIG. 1 is a schematic perspective view of an exemplary embodiment of a composite fiber component during manufacture in accordance with a method according to the invention.

FIG. 1 shows a schematic perspective view of an exemplary embodiment of a composite fiber component 1 during manufacture in accordance with a method according to the invention.

Two molding cores 4 which have an approximately trapezoidal cross section and whose manufacture will be explained further below are arranged with their base 5 resting on a base part 2. The base part 2 has at least one layer of a fiber semi-finished product.

In a further step, further fiber semi-finished products are positioned on the molding cores 4. The fiber semi-finished products 3 rest here with a central section on the external surface of the molding cores 4 and with their ends on the base part 2, that is to say for example on the skin of an aircraft.

It is possible to use various fabrication methods to manufacture the composite fiber component. The infusion method may be selected in order to introduce a matrix, that is to say for example epoxy resin, into the fiber semi-finished products 3. The prepreg method can be equally well used here.

In a further step, the base part 2 is cured with the molding cores 4 and the fiber semi-finished products 3 in an oven or autoclave, depending on the method, with the application of heat and pressure.

The fiber semi-finished products 3 are cured, for example, in a suitable oven or autoclave (not illustrated) to form stringers 20. The at least partially cured composite fiber component 1 consequently has the two Ω stringers 20 after the curing process.

Figure 2:
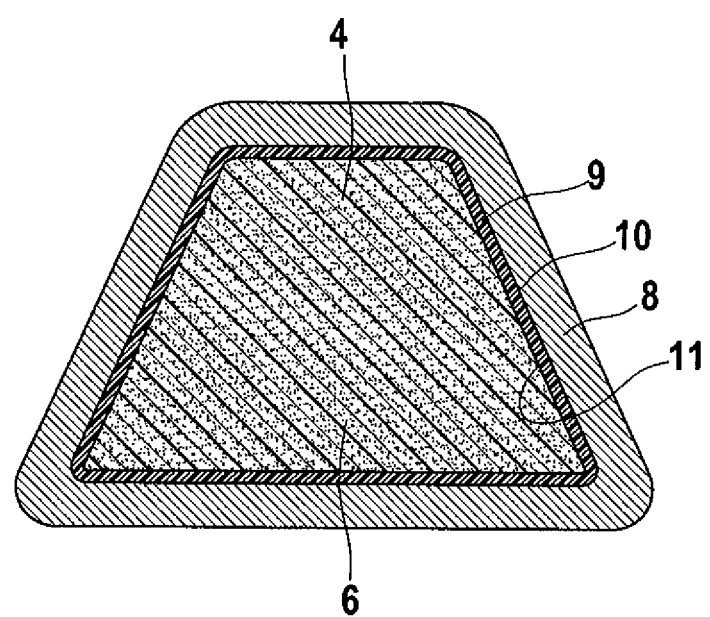
FIG. 2 is a schematic sectional illustration of a general molding core of the composite fiber component according to FIG. 1.

FIG. 2 shows a schematic, general sectional illustration of an inventive molding core 4 of the composite fiber component 1 according to FIG. 1 in a cross section.

The molding core 4, details of whose design will be given further below, has a cross section 6 which is formed in a mold 8 and is given the desired shape, here an approximately trapezoidal shape, in said mold in a conventional fashion, for example with the application of heat and pressure. In this example, the molding core 4 is surrounded by a core sleeve 9 which completely encloses the molding core 4. It prevents direct contact between the molding core 4 and the composite fiber component 1. Possible undesired exchange of material between 1 and 4 is thus prevented and the later removal of the molding core 4 from the mold is facilitated since it cannot adhere to the composite fiber component 1. It is important here that the core sleeve 9 should reliably withstand the process temperature and the process pressure. In some embodiments, core sleeve 9 can be, for example, formed from a plastic, such as a polyamide and/or a PTFE plastic. The core sleeve 9 bears with its inner side 11 directly on the surfaces of the molding core 4, and in this example its outer side 10 is coated with a separating layer (not shown) which can also be composed of an additional sleeve. The separating layer serves for later separating the core sleeve 9 from the composite fiber component 1 if the core sleeve 9 is also to be removed after the removal of the molding core 4 from the mold.

The molding core 4 according to the invention is composed of individual segments 16a ... d which extend in the longitudinal direction of the molded section 14 (FIG. 1). A cross section through such a molding core 4 is illustrated schematically in FIGS. 3A and 3B.

Figure 3A:
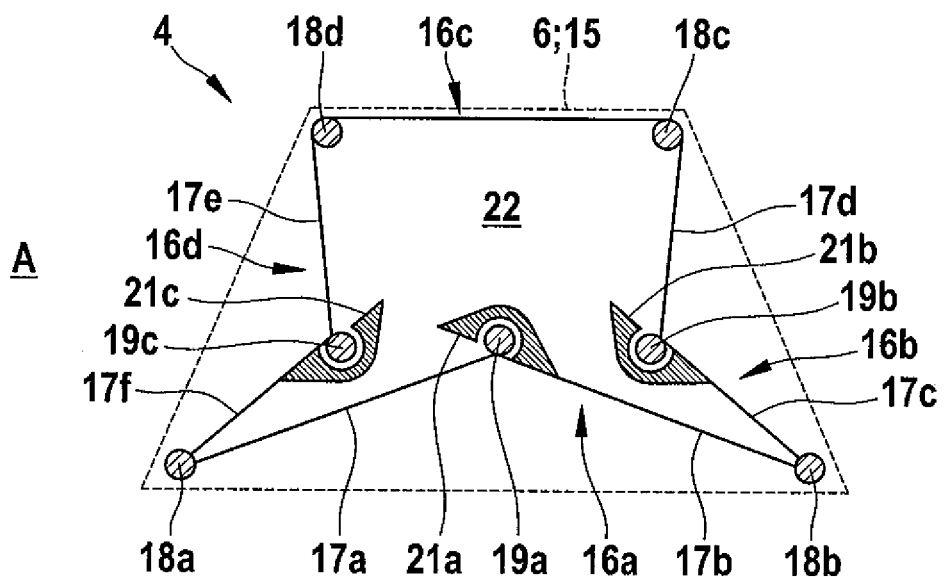
FIG. 3A is a schematic sectional illustration of an inventive molding core of the composite fiber component according to FIG. 1 in a folded position.

In this context, the dashed outline of the cross section 6 of the unfolded molding core 4 or of a hollow profile 15 is indicated. The side surfaces of this hollow profile 15 are formed by the segments 16a ... d. In the folded position A of the molding core 4 which is shown in FIG. 3A, the segments 16a ... d are connected in an articulated fashion by means of first connections 18a ... d at their corner points or corner joints. Furthermore, the segments 16a, 16b and 16d are each divided into two subsegments 17a/17b, 17c/17d and 17e/17f which are themselves connected in an articulated fashion by means of second connections 19a ... c at central points (central joints) here. In each case one of the respective two subsegments 17a/17b, 17c/17d and 17e/17f is lengthened beyond the respective second connection 19a ... c and forms in each case a projection 21a ... c.

In this folded position A, the second connections 19a ... c are folded towards the centre of the hollow profile 15. This results in a folded profile which has a smaller cross section than the hollow profile 15. On the one hand, FIG. 3 clearly shows that the first connections 18a and 18b of the molding core 4 each have only linear contact in the form of sliding rails with the interior of the molded section 14, which can easily be thought of instead of the cross section 6, and this may be advantageous when removing, that is to say pulling out, the molding core 4 from the molded section 14. On the other hand, FIG. 3 clearly shows that in the folded position A the molding core 4 is smaller than the hollow profile 15 and is thus smaller than the cross section of the molded section 14, so that it can easily be removed from the mold.

Figure 3B:
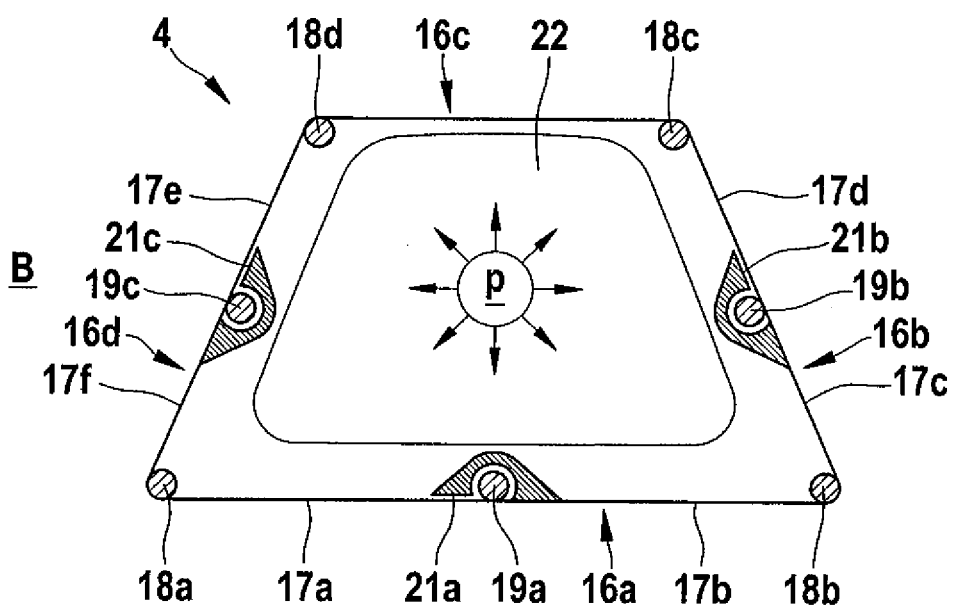
FIG. 3B is a schematic sectional illustration of the inventive molding core according to FIG. 3A in an unfolded position.

In order to form the unfolded position B, a pressure is applied to the interior 22 formed by the segments 16a ... d, which unfolds the segments 16a ... d as shown in FIG. 3B. In this unfolded position B, the free ends of the projections 21a ... c rest on the respective corresponding subsegment 17a, 17d, 17e, and they each form a stop for this position.

Figure 4A:
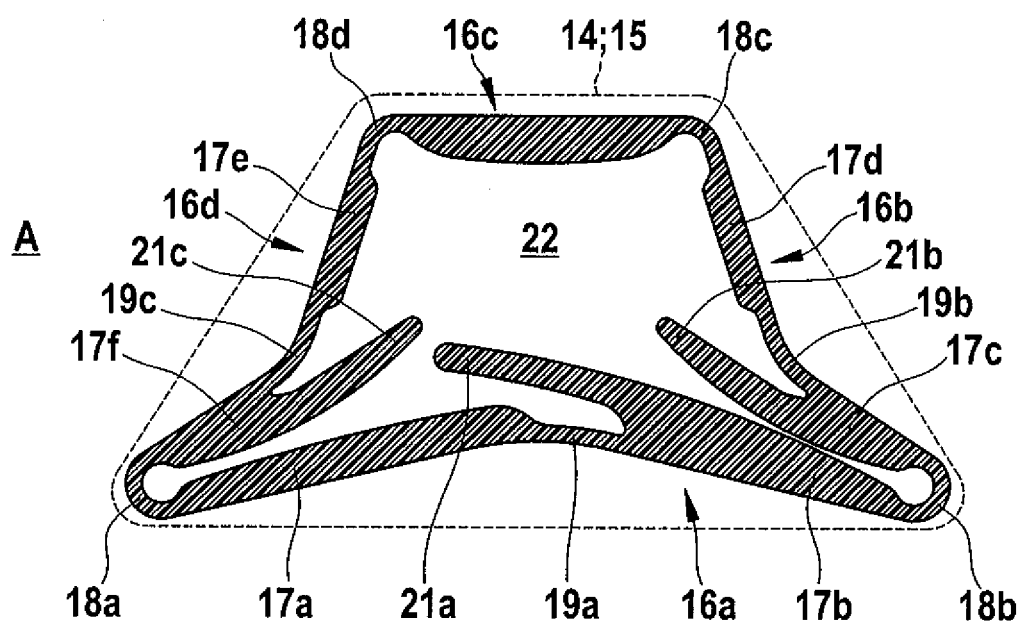
FIG. 4A is a sectional illustration of a first exemplary embodiment of the inventive molding core according to FIG. 3A in the folded position.
Figure 4B:
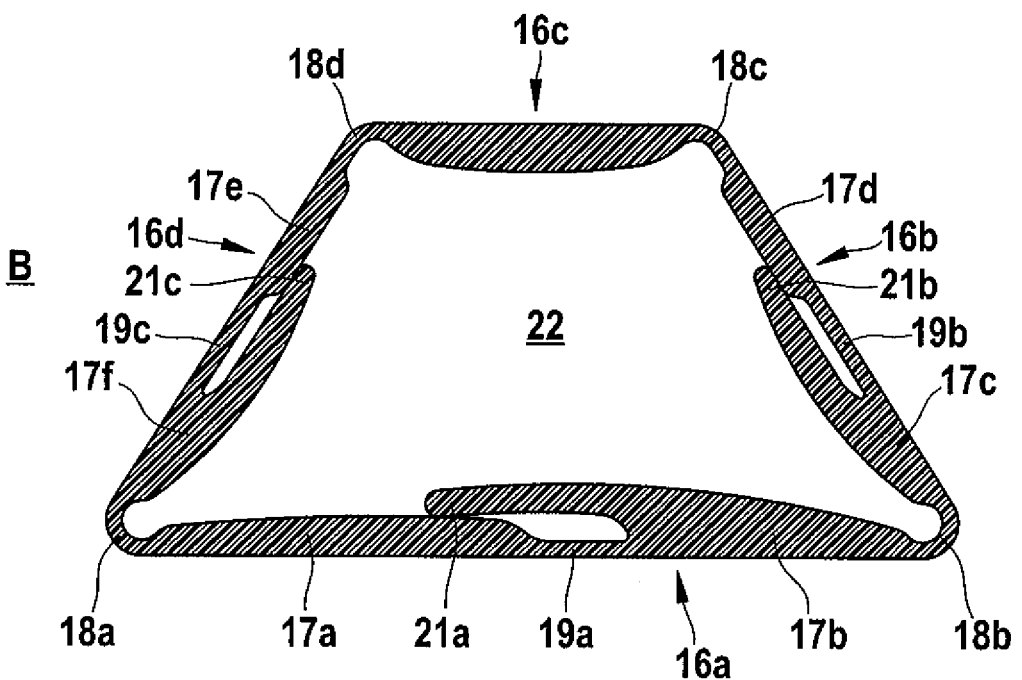
FIG. 4B is a sectional illustration of the first exemplary embodiment of the inventive molding core according to FIG. 4A in the unfolded position.
Figure 5:
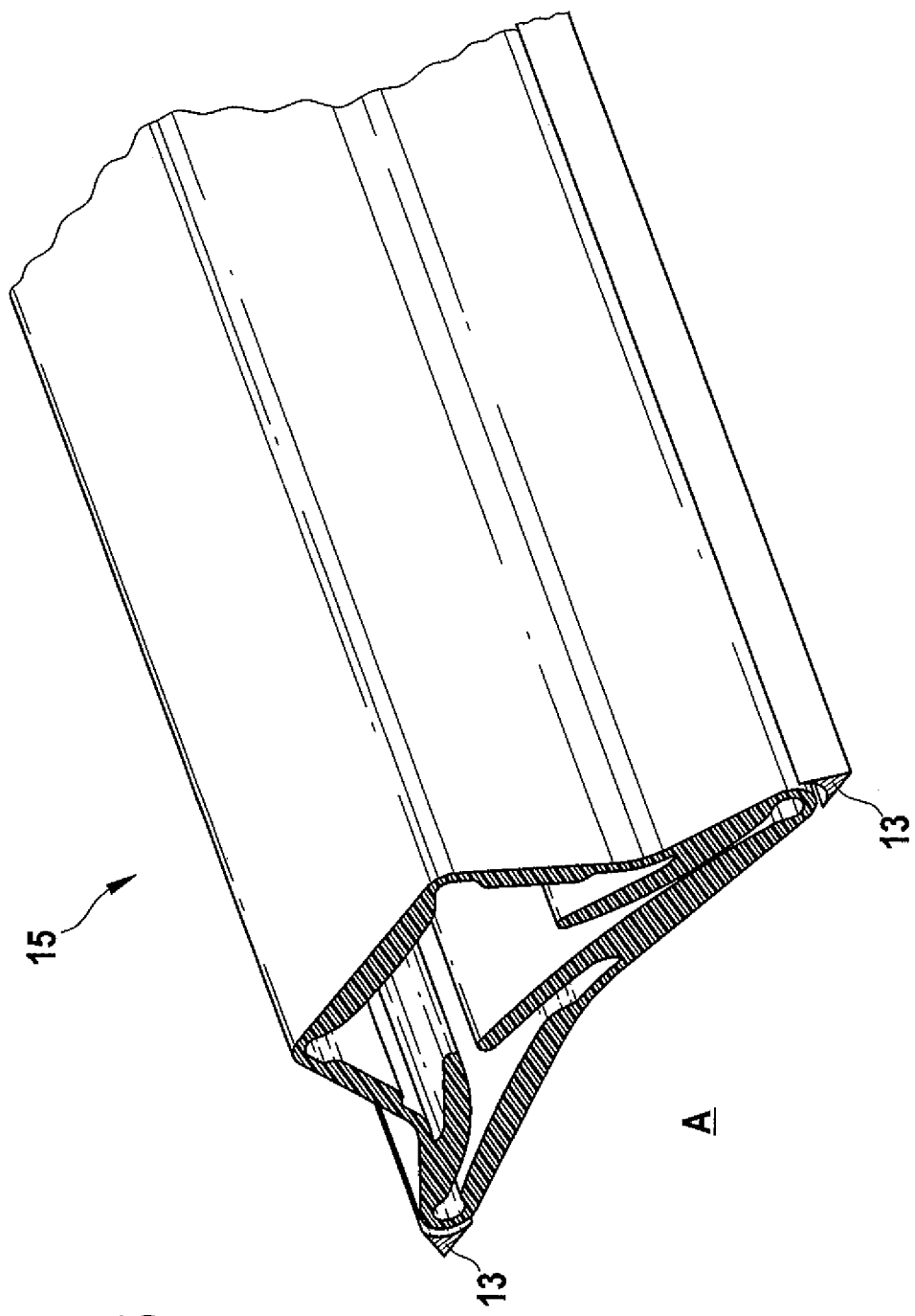
FIG. 5 is a perspective illustration of the first exemplary embodiment of the inventive molding core according to FIG. 4A.

A first exemplary embodiment of an inventive molding core 4 with pivotable segments 16a ... d is illustrated in a way corresponding to the FIGS. 3A and 3B in FIGS. 4A and 4B, with FIG. 5 showing a perspective illustration of the first exemplary embodiment. FIG. 4A shows the folded position A and FIG. 4B shows the unfolded position B.

The segments 16a ... d are manufactured in one piece with the first connections 18a ... d and the subsegments 17a ... f are manufactured in one piece with the second connections 19a ... c from one substance. The connections 18a ... d and 19a ... c are constructed here as film hinges. These film hinges are matched in terms of their geometry (width and thickness) in this example in such a way that sufficient prestress is ensured and movement always takes place in the elastic region of the hinge material. As a result, the properties, in particular the prestress and the necessary folding moment, remain constant over a plurality of folding processes. Consequently, re-use is possible. The film hinges are matched in such a way that the projections 21a ... c all reach their stops simultaneously (with the same internal pressure). The geometry of the molding core 4 is configured in such a way that the projections 21a ... c cannot impede one another. The configuration of the thickness of the connections 18a ... d and 19a ... c permits a prestress to be applied to the segments 16a ... d and subsegments 17a ... f in such a way that a specific sequence is achieved during the folding and unfolding processes.

In order to construct sharp corners, FIG. 5 shows two reinforcement means 13 in the form of corner profiles. The latter can be provided subsequently on the respective edges of the hollow profile 15. It is also possible for the segments 16a ... d and/or the subsegments 17a ... f and/or the connections 18a ... d to be constructed in a lengthened form in order to form such corner profiles. In some embodiments, reinforcement means 13 can be constructed as corner profile parts that can be made of at least one of metal or plastic.

The hollow profile 15 which is formed from the segments 16a ... d has a closed cross section and is therefore referred to as a closed hollow profile 15. The hollow profile 15 can be manufactured, for example, by extrusion. In some embodiments, segments 16a ... d and subsegments 17a ... f can comprise a plastic, for example a polysulfone. First connections 18a ... d and second connections 19a ... c can comprise the same material or have a second material which is particularly suitable for the necessary properties of the connections.

Figure 6A:
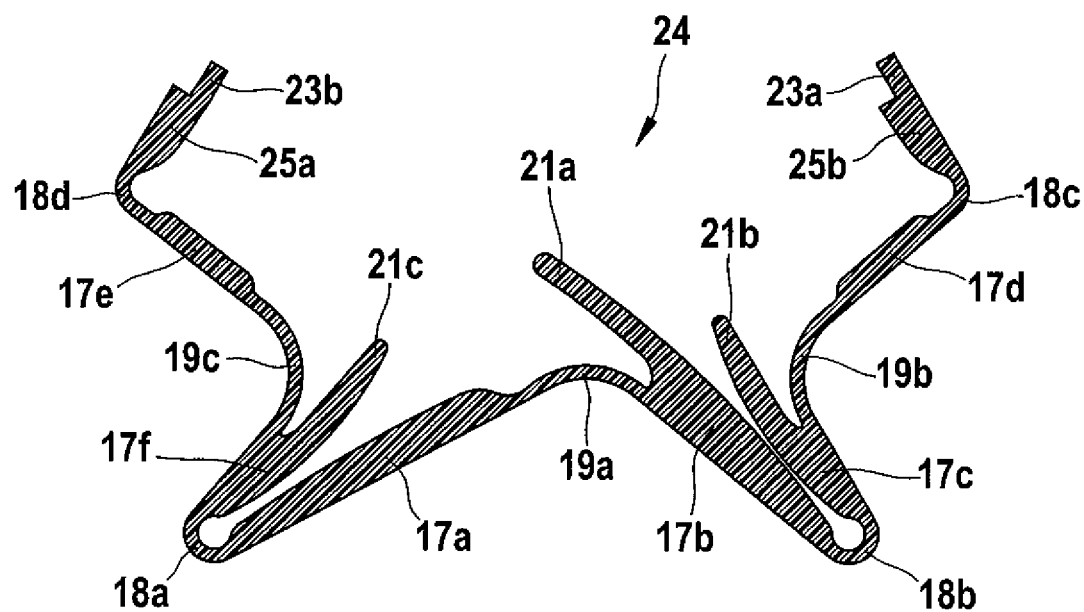
FIG. 6A is a sectional illustration of a second exemplary embodiment of the inventive molding core in a first position.
Figure 6B:
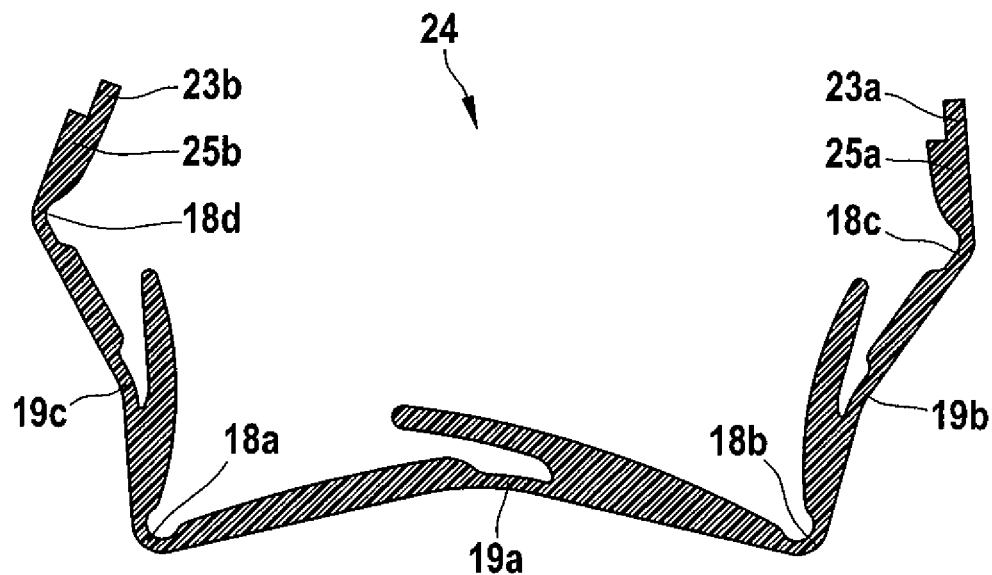
FIG. 6B is a sectional illustration of the second exemplary embodiment of the inventive molding core in a second position.

An alternative second exemplary embodiment in the form of an open profile 24 is shown by FIGS. 6A and 6B in two positions for different prestresses.

The open profile 24 has, in addition to the abovementioned points, the advantage that during manufacture the individual connections can be embodied precisely in order to generate desired prestresses. Furthermore, the extrusion is possible in different positions, of which FIGS. 6A and 6B show two possibilities.

Furthermore, the open profile 24 can, in contrast to a closed one, be manufactured with tighter tolerances.

The open profile 24 is processed after its manufacture to form a closed profile 15 by virtue of the fact that in the example shown here two semi-segments 25a, b are joined to form one segment, for example the segment 16c from FIGS. 3A, 3B, 4A, 4B. This can be done, for example, by welding, with third connections 23a, b which correspond to one another and are in the form of longitudinal projections being arranged on the free edges of the semi-segments 25a, b lying opposite one another in this example.

Figure 7:
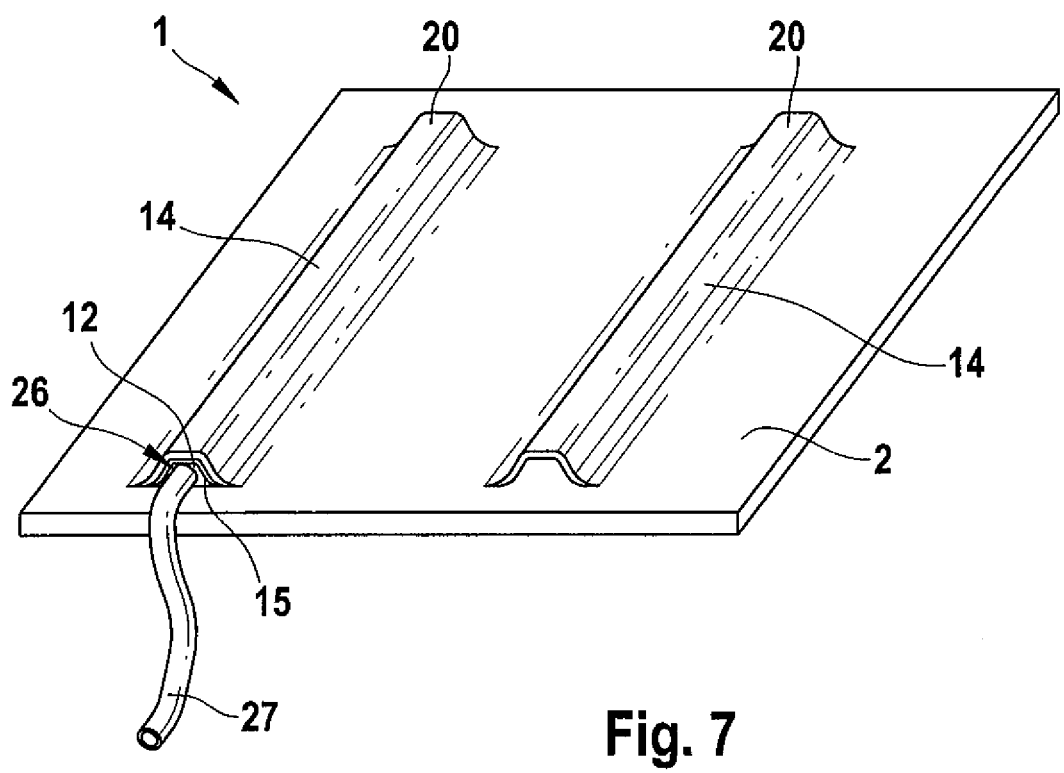
FIG. 7 is a schematic perspective view of the composite fiber component according to FIG. 1 during the removal of an inventive molding core in accordance with the method according to the invention.

FIG. 7 shows a schematic perspective view of the finished composite fiber component 1 according to FIG. 1 with molded sections 14 which are constructed as stringers 20.

On the left-hand side, a molded section 14 is shown in which one end of the hollow profile 15 of the molding core 4 is indicated, said end being connected to a connecting device 26 with a line 27 for the application of the internal pressure p. The other end of the hollow profile 15 is closed off with a closure in the folded state. This is necessary in order to permit removal from the mold in the direction of the lower end of the figure. The junction region with the unfolded state (length of the junction is approximately twice the width of the molding core) cannot be used for molding. Correspondingly, the molding core must project far beyond the end of stringers 20.

By varying the internal pressure p, the hollow profile 15 can be unfolded and folded. However, it is also possible to provide it with a further connecting device 26. The internal pressure p can be measured at a suitable point in order to regulate it. An opening in the core sleeve 12 is also arranged outside the molded section 14.

During removal from the mold, an internal pressure (vacuum) which is such that the hollow profile 15 assumes the folded position A is applied to the hollow profile 15 via the connecting device 26.

If the removal from the mold is performed, for example, subsequent to curing in a pressure vessel/autoclave within this pressure vessel, it is possible to apply a correspondingly high vacuum of, for example, 10 bar. This can be taken into account if a geometry of a hollow profile 15 is used in which the simple atmospheric vacuum is not sufficient for the folding. Such a process can be automated.

It is furthermore possible to apply pressure to the outer side of the hollow profile 15 between the inner side of the molded section 14 or inner side of the core sleeve 9 and the outer side of the hollow profile 15 in order to fold the hollow profile 15. This pressure can also be applied in a way which supports the internal pressure p.

The molding core 4 which is folded in this way can be pulled out of the cured molded section 14 and used again. The core sleeve 9 is likewise pulled out, which can be done in a particularly simple and easy way if a separating layer is present. The composite fiber component 1 can then be further processed. If reinforcement means 13 are used, they can likewise also be pulled out or remain in the composite fiber component 1.

A method for manufacturing a composite fiber component, a corresponding molding core and a corresponding composite fiber component are thus provided which permit a significant reduction in material costs compared to the use of conventional materials for the supporting or molding core. The molding core is removed completely, allowing the weight of the composite fiber component to be reduced compared with the prior art. It is possible to expect that the molding core 4 will be re-used repeatedly and subsequently recycled, permitting a reduction in costs.

The invention is not restricted to the specific method for manufacturing a composite fiber component in the field of aircraft which is illustrated in the figures.

For example, the present inventive idea can thus also be applied to composite fiber components in the field of sports equipment or motor sports.

In addition, the individual sequence of individual method steps of the manufacturing method according to the invention can be varied in a wide variety of ways. The configuration of the individual method steps can also be modified.

Furthermore, the geometry of the molding core can be modified in a variety of ways.

In addition, it is also possible to use a plurality of molding cores in order to construct a single molding core which is wrapped with composite fiber matting. This fulfils the aim of providing a more complex geometry by means of the large number of molding cores. Consequently, relatively complex composite fiber components can be manufactured.

It is thus possible, for example, also to divide the segment 16c (FIGS. 3A, 3B, 4A, 4B) into two subsegments with a central joint. A plurality of subsegments of one segment are also conceivable.

What is claimed is:

1. A molding core for manufacturing a composite fiber stringer component for aerospace applications, the molding core comprising a hollow profile which is made in one piece from segments which establish the external geometry of the molding core, wherein the segments each extend in the direction of the longitudinal axis of the molding core and can each be pivoted about at least one axis running in the longitudinal direction of the molding core, wherein the segments are connected by first connections and are constructed to pivot about said axis by the first connections between a folded position and an unfolded position of the hollow profile of the molding core, wherein at least one of the segments comprises at least two subsegments which are connected by a second connection and which can be pivoted about at least one longitudinal axis of the molding core by the second connection, wherein at least one of the subsegments is lengthened beyond the respective second connection so as to form a projection extending the width of the respective subsegment over the second connection and forming a stop for the unfolded position, and wherein the first and second connections are constructed as film hinges in one piece together with the segments and subsegments to provide for said pivoting movements.

2. The molding core according to claim 1, wherein the film hinges are matched in terms of their width and thickness so that movement takes place in the elastic region of the hinge material.

3. The molding core according to claim 1, wherein the segments and subsegments comprise a plastic and the first and second connections comprise the same material or have a second material which is particularly suitable for the necessary properties of the connections.

4. The molding core according to claim 1, wherein the hollow profile is provided with an enclosing core sleeve.

5. The molding core according to claim 4, wherein the core sleeve has a separating layer which forms an external surface of the molding core.

6. The molding core according to claim 4, wherein the core sleeve is formed from a plastic which is suitable for the processing temperatures and pressures required for the manufacture of said composite fiber stringer component.

7. The molding core according to claim 1, wherein the hollow profile of the molding core has reinforcement means in the region of junctions in its external geometry, and wherein the reinforcement means comprise sharp edges.

8. The molding core according to claim 7, wherein the reinforcement means are constructed as corner profile parts made of at least one of metal and plastic.

9. The molding core according to claim 8, wherein the reinforcement means are components of the segments and/or of the connections.

10. The molding core according to claim 1, wherein the external geometry of the molding core is constructed in the shape of an omega, a trapezium, a triangle, a ring and/or a wave in the unfolded position of the hollow profile.

* * * * *